United States Patent [19]

Werner

[11] Patent Number: 4,507,842

[45] Date of Patent: Apr. 2, 1985

[54] METHOD OF SEALING AND PROTECTING A PLASTIC LINED PIPE JOINT

[76] Inventor: John Werner, Box 14, Independence, Kans. 67301

[21] Appl. No.: 524,760

[22] Filed: Aug. 19, 1983

[51] Int. Cl.³ .............................................. B23P 11/02
[52] U.S. Cl. ........................................ 29/451; 29/458; 29/464; 29/455 R; 277/1; 277/11; 285/27; 285/55; 285/371
[58] Field of Search ...................... 29/451, 157 R, 458, 29/525, 464, 455 R; 285/55, 27, 371; 277/1, 11

[56] References Cited

U.S. PATENT DOCUMENTS

| 2,261,566 | 11/1941 | Russell et al. | 285/371 X |
| 2,938,562 | 5/1960 | Watts et al. | 285/55 X |
| 3,253,841 | 5/1966 | Ahmad | 285/55 |
| 3,266,821 | 8/1966 | Safford | 285/55 X R |
| 3,451,119 | 6/1969 | Coberly et al. | 29/525 X |
| 3,596,931 | 8/1971 | Mishler | 285/55 |
| 4,043,857 | 8/1977 | Byrne et al. | 29/455 R X |

Primary Examiner—Charlie T. Moon
Attorney, Agent, or Firm—Head, Johnson & Stevenson

[57] ABSTRACT

A method for sealing and protecting a plastic lined pipe joint from corrosive fluid passing through the plastic lined pipe involving the placing of a plastic collar seal internally within the pipe joint at the time of assembly of the pipe joint. The plastic collar seal involves concentric O-rings at each end that annularly seal off the end of the pipe and pipe collar. An external ridge on the collar seal allows the collar seal to rest on the end of the pipe section during assembly and assists in assembling the joint. Such a collar seal has been found to be particulrly useful in oil and gas well applications for injecting corrosive fluids into the well.

1 Claim, 2 Drawing Figures

METHOD OF SEALING AND PROTECTING A PLASTIC LINED PIPE JOINT

BACKGROUND OF THE INVENTION

1. Field of the Invention

This invention relates to an improved collar seal for plastic lined pipe and a method of using the same. More specifically, this invention relates to a plastic collar seal for downhole use in oil field applications for protecting the plastic lined pipe at the pipe joint.

2. Description of the Prior Art

The concept of employing a plastic lined pipe in an oil or gas well which is to be treated with highly corrosive fluid is a known and accepted commercial practice. Thus, it is known to use a pvc lined steel pipe to deliver acids and the like to a desired depth in a gas or oil well. It is also well known that such pipes or tubing involve the assembling of many shorter pipe sections wherein each pipe joint created at the junction of two pipe sections represents a potential weak point and region susceptible to acid or corrosive attack. Thus, to extend the life of the plastic lined pipe, various gaskets or pipeline couplings have been proposed with varying degrees of success, yet none have proven to be entirely reliable. For example, the use of an internal gasket to be held under compression between the two respective pipe ends seems to be a reasonable solution. However, in practice, the repeated assembling and disassembling of pipe under oil field conditions quickly leads to a high frequency of pipe joint failure for compressive gasket type pipe couplings. Thus, the need for a reliable yet easily installed and reuseable plastic lined pipe joint, particularly for oil field applications, still exists.

SUMMARY OF THE INVENTION

In view of the problems associated with using a plastic lined pipe within an oil or gas well in order to deliver a highly corrosive fluid to a selected subterranean strata and the equivalent problem associated with producing highly corrosive fluids, I have discovered an improved method for sealing and protecting a plastic lined pipe joint. Thus, according to the present invention, an improved plastic collar seal is placed in the interior of a pipe joint formed between first and second externally threaded plastic lined pipe sections which are to be held together by an internally threaded pipe collar. The improved plastic collar seal, according to the present invention, is a hollow, open ended, cylindrical plastic collar seal presized to concentrically fit within the plastic liner of the sections of plastic lined pipe with minimum concentric tolerance. The open ends of the plastic collar seal are internally beveled and the plastic collar seal is equipped with external O-ring grooves and O-rings at each of the ends. The collar seal is further provided with an external ledge or ridge molded concentrically to the collar seal between the O-rings wherein the ledge is adapted to fit within the internally threaded collar and rest on the end of the lined pipe. This ledge is positioned such that the distance from at least one end of the collar seal to the ledge exceeds the length of the internally threaded collar. In operation, the collar is threaded on the first plastic lined pipe section and the improved plastic collar seal is inserted within the pipe section and collar with the ledge coming to rest on the end of the pipe section leaving the other end of the plastic collar seal extending beyond the collar. The second section of plastic lined pipe can then be easily threaded into the internally threaded collar, over the collar seal, thus forming a tight pipe joint with the collar seal within the joint.

It is an object of the present invention to provide a plastic collar seal to be used in a conventional plastic lined pipe joint, wherein the collar seal can be readily inserted in the partially assembled joint and be used to assist in aligning the assembly of the second section of pipe. It is a further object that the beneficial pipe joint sealing associated with the present invention be independent of the extent to which the pipe sections are threaded together, thus allowing for significant variation in the compression and depth of penetration associated with the pipe joint. Fulfillment of these objects and the presence and fulfillment of other objects will be apparent upon a complete reading of the specification and claims taken in conjunction with the attached drawing.

DESCRIPTION OF THE PREFERRED EMBODIMENTS

Figure 1:
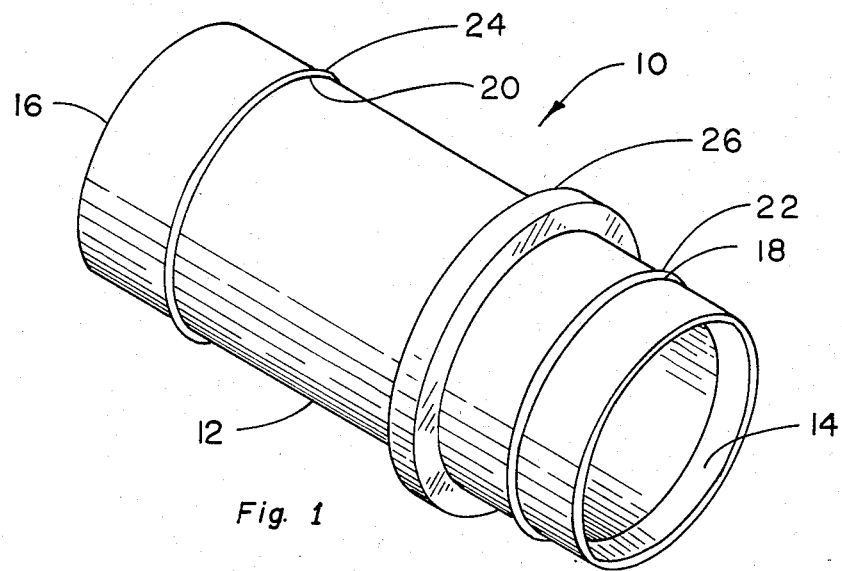
FIG. 1 is a perspective view of the plastic collar seal according to the present invention.

The improved collar seal for plastic lined pipe, how it is used and the advantages associated with its use can perhaps be best explained and understood by reference to the drawings. FIG. 1 illustrates the improved plastic collar seal according to the present invention, generally designated by the numeral 10. As shown, the collar seal 10 is a hollow, open ended, cylindrical tube 12 having the internal edges 14 and 16 of each end beveled or chamfered such as to reduce turbulence in the fluid passing through the pipe joint. On the external surface of the cylindrical tube 12, near each end, are O-ring grooves 18 and 20 with O-rings 22 and 24. Positioned between these O-rings 22 and 24 is an external ridge or ledge 26 which is molded to the cylindrical tube 12 and is adapted to rest on the end of the pipe section within the pipe joint as illustrated in FIG. 2.

In order to use the plastic collar seal 10 in a pipe joint, according to the present invention, a pair of plastic lined pipe sections with externally threaded ends and an internally threaded pipe collar, which assemble into a conventional pipe joint, are to be provided. Preferably (see FIG. 2), a first plastic lined pipe section 28 is threaded into the pipe collar 30, thus forming a partially assembled pipe joint. The shorter end 32 of the plastic collar seal 10 is inserted into the partially completed pipe joint such that the O-ring 22 seals against the inner plastic liner 34 of the first pipe section 28. The ledge 26 is pushed against the end of the first lined pipe section 36, leaving the longer end 38 of the plastic collar seal 10 temporarily extending beyond the partially assembled pipe joint. The second plastic lined pipe section 40 is then inserted over the longer end 38 and threaded into the pipe collar 30, completing the assembly of the pipe joint as shown in FIG. 2.

Figure 2:
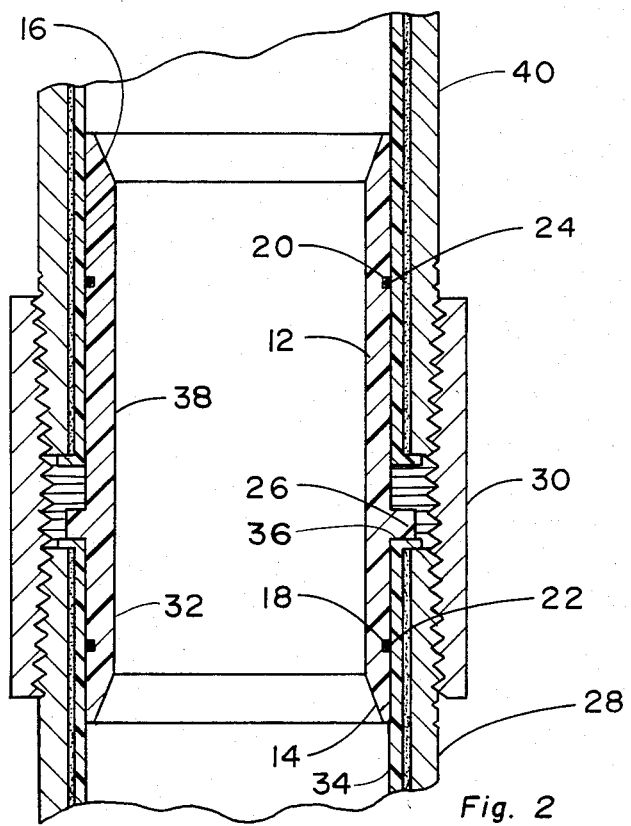
FIG. 2 is a cut-away view of the plastic collar seal of FIG. 1 within a pipe joint between two sections of plastic lined pipe.

As further illustrated in FIG. 2, the assembled pipe joint with protective collar seal 10 has minimum internal upset at the pipe joint, yet the critical metal threads of the joint are completely sealed from the corrosive fluid transported in the pipe. No compressive seal longitudinal to the direction of the pipe is involved in the joint; thus, the extent to which the pipe sections and collar are threaded together is immaterial. This in turn allows for greater variation in the tolerance between threaded pipe and collar and allows the use of inexpensive pipe threads. Also, by making the distance between the support ridge and at least one end of the collar seal longer than the length of the pipe collar (i.e., having the pipe collar seal extend out of the collar during assembly) the pipe collar seal will assist in aligning and bayoneting together the pipe sections.

It is envisioned that the pipe collar seal can be made out of any non-corrosive composition as well known in the art. Preferably, the collar seal is made from the same plastic as employed in the lining of the pipe sections. Polyvinyl chloride, PVC, is the most preferred composition for oil and gas well applications. The plastic collar seal can be manufactured by any of the methods well known in the art. Preferably, the collar seal is either injection molded or cut and machined from an extruded thick walled tube. Similarly, the O-ring grooves can either be initially molded into the injection molded part or can be machined into the exterior of the tube. Preferably, the O-rings are manufactured out of a corrosion resistant elastomeric composition, again as well known in the art.

Having thus described the preferred embodiments with a certain degree of particularity, it is manifest that many changes can be made in the details of construction, arrangement of the elements, and the sequence of assembling the elements (i.e., inserting the pipe collar seal into the pipe section before threading the pipe collar to the pipe) without departing from the spirit and scope of the invention. Therefore, it is to be understood that the invention is not limited to the embodiments set forth herein for purposes of exemplification, but is to be limited only by the scope of the attached claims, including a full range of equivalents to which each element thereof is entitled.

I claim:

1. An improved method for sealing and protecting a plastic lined pipe joint from corrosive fluid passing through the plastic lined pipe comprising the steps of:
   (a) providing a first and second section of plastic lined pipe having externally threaded ends such that an internally threaded collar can be employed to form the pipe joint holding said pipe segments together;
   (b) threading an internally threaded collar onto one end of the first of said plastic lined pipe sections;
   (c) providing a hollow, open ended, cylindrical plastic collar seal presized to concentrically fit within the plastic liner of said sections of plastic lined pipe with minimum concentric tolerance and wherein said open ends of said plastic collar seal are internally beveled and wherein said plastic collar seal is equipped with external O-ring grooves and O-rings at each of said ends and wherein said collar seal is further provided with an external ledge means molded concentrically to said collar seal between said O-rings, and wherein said ledge means is adapted to fit within said internally threaded collar and rest on the end of said lined pipe and wherein said ledge means is positioned such that the distance from at least one end of said collar seal to the ledge means exceeds the length of said internally threaded collar;
   (d) placing said plastic collar seal within said plastic lined pipe and threaded collar such that one end of said collar seal extends out of said collar threaded on said first section of plastic lined pipe and said ledge means rests on the end of said first section of plastic lined pipe; and
   (e) threading said second section of plastic lined pipe into said internally threaded collar thus forming a tight pipe joint with said collar seal within said joint.

* * * * *